US010808878B2

(12) United States Patent
Lee et al.

(10) Patent No.: US 10,808,878 B2
(45) Date of Patent: Oct. 20, 2020

(54) SUPPORTING STAND

(71) Applicant: SYNCMOLD ENTERPRISE CORP., New Taipei (TW)

(72) Inventors: Jen-Yi Lee, New Taipei (TW); Ming-Chih Shih, New Taipei (TW)

(73) Assignee: SYNCMOLD ENTERPRISE CORP., New Taipei (TW)

( * ) Notice: Subject to any disclaimer, the term of this patent is extended or adjusted under 35 U.S.C. 154(b) by 0 days.

(21) Appl. No.: 16/514,192

(22) Filed: Jul. 17, 2019

(65) Prior Publication Data

US 2020/0025328 A1 Jan. 23, 2020

Related U.S. Application Data

(60) Provisional application No. 62/699,289, filed on Jul. 17, 2018.

(51) Int. Cl.
*F16M 11/10* (2006.01)
*F16M 11/18* (2006.01)
*F16M 11/20* (2006.01)
*F16M 11/22* (2006.01)

(52) U.S. Cl.
CPC ............ *F16M 11/10* (2013.01); *F16M 11/18* (2013.01); *F16M 11/2021* (2013.01); *F16M 11/22* (2013.01); *F16M 2200/021* (2013.01)

(58) Field of Classification Search
CPC .... F16M 11/10; F16M 11/18; F16M 11/2021; F16M 11/22
USPC ...... 248/688, 121, 122.1, 123.11, 371, 372.1, 248/398, 397, 177.1, 178.1, 346.06
See application file for complete search history.

(56) References Cited

U.S. PATENT DOCUMENTS

| 6,609,272 B1* | 8/2003 | Lee ................... E05D 11/082 16/307 |
| 6,772,983 B1* | 8/2004 | Liao .................. E05D 11/087 16/340 |
| 7,533,856 B2* | 5/2009 | Mollenhauer ......... F16M 11/10 248/123.11 |

(Continued)

FOREIGN PATENT DOCUMENTS

CN 204805876 U 11/2015

*Primary Examiner* — Terrell L McKinnon
*Assistant Examiner* — Michael McDuffie
(74) *Attorney, Agent, or Firm* — Muncy, Geissler, Olds & Lowe, P.C.

(57) ABSTRACT

A supporting stand for supporting a panel is provided. The supporting stand comprises a base, a one-way damper, a force module, and a rotating element. The one-way damper is disposed on the first connecting board. The force module is disposed on the base and including a mandrel. The rotating element is connected to the panel, the one-way damper, and the force module, and is actuated together with the one-way damper and the force module so that the panel is capable of rotating around the mandrel in a first rotating direction or a second rotating direction. When the rotating element rotates in the first rotating direction, the one-way damper provides a first backward torque to the rotating element; when the rotating element rotates in the second rotating direction, the one-way damper do not provide torque to the rotating element but the force module provides a second forward torque when the rotating element rotates in the second rotating direction.

18 Claims, 10 Drawing Sheets

(56) References Cited

U.S. PATENT DOCUMENTS

| | | | | |
|---|---|---|---|---|
| 8,891,248 B2* | 11/2014 | Chu | ................ | F16M 11/10 |
| | | | | 248/122.1 |
| 2002/0126110 A1* | 9/2002 | Bowron | ................ | F16M 11/10 |
| | | | | 345/204 |
| 2012/0006962 A1* | 1/2012 | Lin | ................ | F16M 13/00 |
| | | | | 248/372.1 |
| 2013/0026314 A1* | 1/2013 | Hu | ................ | F16M 11/10 |
| | | | | 248/157 |
| 2013/0320160 A1* | 12/2013 | Chiang | ................ | F16M 11/046 |
| | | | | 248/121 |
| 2014/0117199 A1* | 5/2014 | Liu | ................ | F16M 11/10 |
| | | | | 248/688 |
| 2014/0319303 A1* | 10/2014 | Kuan | ................ | F16M 11/10 |
| | | | | 248/346.06 |
| 2014/0319304 A1* | 10/2014 | Kuan | ................ | F16M 13/00 |
| | | | | 248/454 |
| 2016/0088749 A1* | 3/2016 | Liu | ................ | F16M 13/00 |
| | | | | 361/807 |
| 2017/0339800 A1* | 11/2017 | Burns | ................ | G06F 1/1622 |

* cited by examiner

SUPPORTING STAND

CROSS REFERENCE TO RELATED APPLICATION

This application claims the benefit of U.S. Provisional Application Ser. No. 62/699,289 filed on Jul. 17, 2018. The entirety of the Application is incorporated herein by reference.

BACKGROUND OF THE INVENTION

1. Field of the Invention

The present invention relates to a supporting stand. More particularly, the present invention relates to a supporting stand for connecting with an object and providing different torques on different rotational directions.

2. Description of Related Art

China Patent No. CN 204805876 disclosed a tablet supporting frame having a universal telescopic structure. Owing to the combination of a spherical shell, a hollow sphere, and a magnetic sphere, a panel can be quickly and conveniently adjusted, for example, facing to the counter person for operation, or facing to the customer for confirmation or clicking. However, there is no stopping structure designed in the conventional structure so that the turning operation may be excessive and hard to position. Furthermore, it will be easily wobbling or out of position in long-term operations of finger tapping to the panel.

SUMMARY OF THE INVENTION

The main object of the present invention is to provide a supporting stand for supporting a panel, wherein the supporting stand has a supporting surface facing different directions and having different inclined angles. Particularly, the torque provided by the supporting stand is different when the supporting stand rotates in two different directions.

To achieve the above object, the present invention disclosed a supporting stand for supporting a panel. The supporting stand comprises a base, a one-way damper, a force module, and a rotating element. The base includes a bottom board and a first connecting board, wherein the first connecting board is disposed on the bottom board. The one-way damper is disposed on the first connecting board. The force module is disposed on the base and includes a mandrel. The rotating element is connected to the panel and the force module and being actuated together with the force module, making the panel be capable of rotating around the mandrel in a first rotating direction or a second rotating direction opposite to the first rotating direction. Wherein the one-way damper provides a first backward torque when the rotating element rotates in the first rotating direction, and the one-way damper do not provide torque to the rotating element but the force module provides a second forward torque when the rotating element rotates in the second rotating direction.

In one embodiment, the force module provides a second backward torque to the rotating element when the rotating element rotated in the first rotating direction.

In one embodiment, the value of the second backward torque provided by the force module is zero.

In one embodiment, an absolute value of a sum of the first backward torque and second backward torque is not equal to an absolute value of the second forward torque.

In one embodiment, the force module further includes a shaft sleeve fixed to the rotating element and the mandrel so that the rotating element is actuated together with the mandrel.

In one embodiment, the base further includes a stopping element and the rotating element further includes a first stop end and a second stop end, wherein the rotating element is located at a first position when the rotating element rotates in the first rotating direction until the first stop end abuts against the stopping element, and the rotating element is located at a second position when the rotating element rotates in the second rotating direction until the second stop end abuts against the stopping element so that the rotating element is able to rotate and stop at any position between the first position and the second position.

In one embodiment, the rotating element further includes a coupling shaft, wherein the coupling shaft and the mandrel is aligning with a same axis, the coupling shaft is connected to the one-way damper for making the one-way damper be actuated together with the rotating element.

In one embodiment, the rotating element further includes a supporting body for supporting the panel.

In one embodiment, the base further comprises a second connecting board disposed on the bottom board and spaced apart from the first connecting board, wherein the force module is disposed on the second connecting board.

In one embodiment, the force module further includes a resistance element connected to the mandrel, wherein the resistance element is a frictional washer set or a two-way damper.

In one embodiment, the force module further includes a resistance element connected to the mandrel, wherein the resistance element is a one-way damper.

In one embodiment, the mandrel is a flathead shaft structure.

The present invention further disclosed a supporting stand for supporting a panel on a working surface. The supporting stand comprises a base, a one-way damper, a force module, and a rotating element. The base includes a first supporting surface, a second supporting surface, and a first connecting board. The first connecting board is disposed on the first supporting surface and the second supporting surface, wherein the first supporting surface and the working surface include a first angle, and the second supporting surface and the working surface include a second angle which is unequal to the first angle. The force module is disposed on the base and including a mandrel. The rotating element is connected to the panel and the force module and is actuated together with the force module so that the panel is capable of rotating around the mandrel in a first rotating direction or a second rotating direction opposite to the first rotating direction. The one-way damper provides a first backward torque when the rotating element rotate in the first rotating direction and the one-way damper do not provide torque to the rotating element but the force module provides a second forward torque when the rotating element rotates in the second rotating direction.

In one embodiment, the force module provides a second backward torque to the rotating element when the rotating element rotated in the first rotating direction.

In one embodiment, the value of the second backward torque provided by the force module is zero.

In one embodiment, an absolute value of a sum of the first backward torque and second backward torque is not equal to an absolute value of the second forward torque.

In one embodiment, the force module further includes a shaft sleeve fixed to the rotating element and the mandrel so that the rotating element is actuated together with the mandrel.

In one embodiment, the base further includes a stopping element and the rotating element further includes a first stop end and a second stop end, wherein the rotating element is located at a first position when the rotating element rotates in the first rotating direction until the first stop end abuts against the stopping element, and the rotating element is located at a second position when the rotating element rotates in the second rotating direction until the second stop end abuts against the stopping element.

In one embodiment, the rotating element further includes a coupling shaft, wherein the coupling shaft and the mandrel is aligning with a same axis, the coupling shaft is connected to the one-way damper for making the one-way damper be actuated together with the rotating element.

In one embodiment, the rotating element further includes a supporting body for supporting the panel.

DETAILED DESCRIPTION OF THE PREFERRED EMBODIMENT

Figure 1:
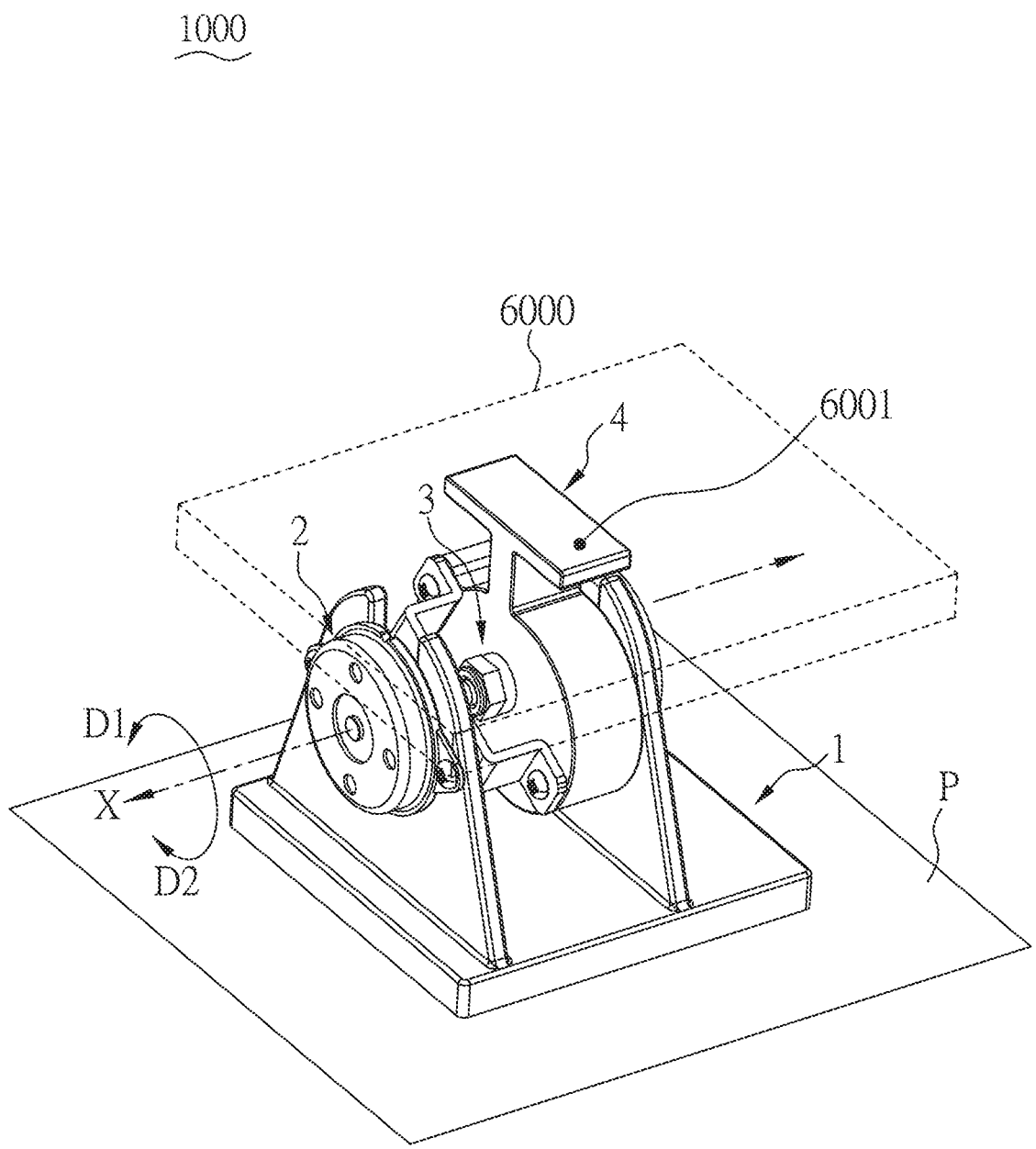
FIG. 1 is a perspective view showing the supporting stand of the first embodiment of the present invention.
Figure 2:
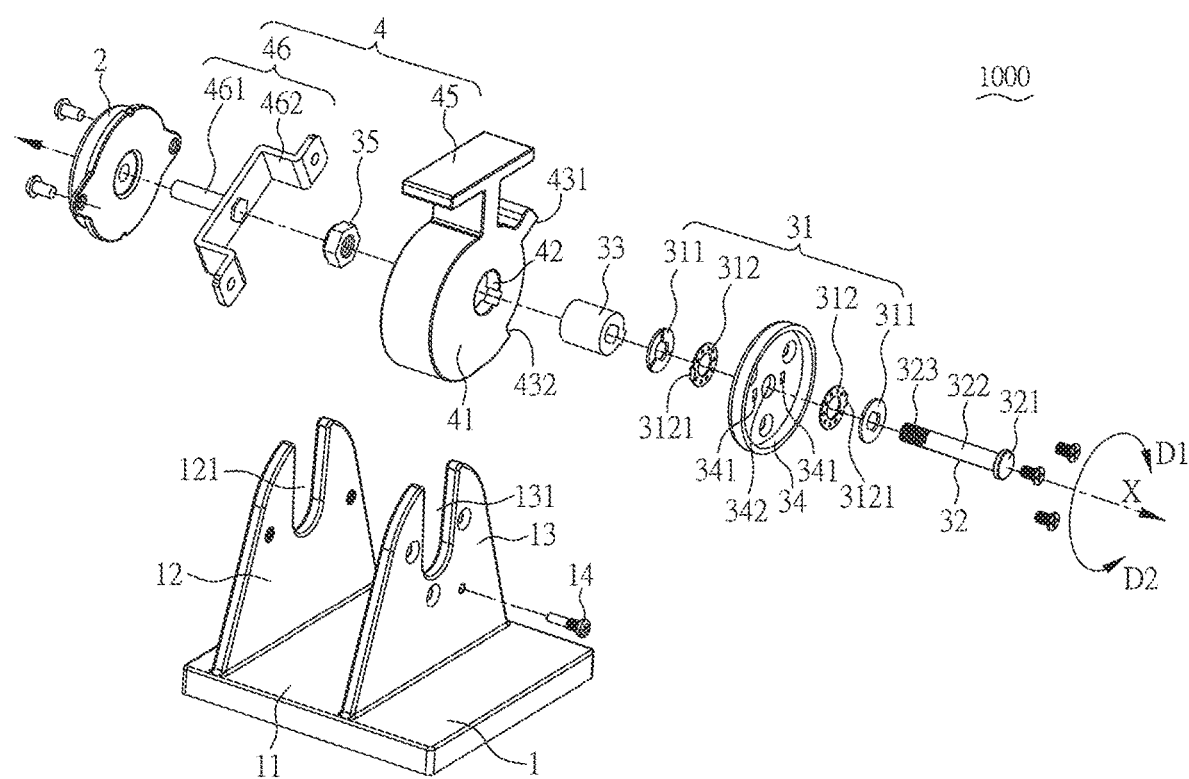
FIG. 2 is an exploded perspective view showing the supporting stand of the first embodiment of the present invention.

Please refer to FIG. 1 and FIG. 2 illustrating the perspective view and the exploded perspective view of the supporting stand 1000 of the first embodiment of the present invention. The supporting stand 1000 is utilized to support a panel 6000 having a center of gravity 6001 on a working surface P. In other embodiment, the panel 6000 may be a display. The supporting stand 1000 comprises a base 1, a one-way damper 2, a force module 3, and a rotating element 4.

The base 1 includes a bottom board 11, a first connecting board 12, a second connecting board 13, and a stopping element 14. The first connecting board 12 and the second connecting board 13 are erectly disposed on the bottom board separately, and are spaced apart in an interval from and parallel to each other. A first breach 121 and a second breach 131 are formed respectively on the top portions of the first connecting board 12 and the second connecting board 13 away from the bottom board 11. The one-way damper 2 is disposed on the first breach 121, and the force module 3 is disposed on the second breach 131, wherein the axis X passes through the first breach 121 and the second breach 131. The stopping element 14 is disposed on the second connecting board 13.

As illustrated in FIG. 2, the one-way damper 2 is disposed on the first connecting board 12 and is actuated together with the rotating element 4.

The force module 3 is disposed on the second connecting board 13 and includes a resistance element 31, a mandrel 32, a shaft sleeve 33, a fixing plate 34, a securing element 35, and three screws 36. In the present embodiment, the resistance element 31 is a frictional washer set. The mandrel 32 is a long rod-shaped shaft having a wider head portion 321, a rod body 322 connected to the head portion 321, and an end portion 323 connected to the rod body 322. The rod body 322 has a non-circular cross-section. The end portion 321 is threaded externally. The resistance element 31 includes washers 311 having a through hole of which shape is corresponding to the cross-section of the rod body 322 and washers 312 having a round-shaped through hole. The shaft sleeve 33 is sleeved on the mandrel 32 and engaged with the rotating element 4, wherein the inner contour of the shaft sleeve 33 and the cross-section of the rod-body 322 are non-circular and are matched to each other, so that the rotating element 4 and the mandrel 32 rotate synchronously. The fixing plate 34 is disposed adjacent to the second connecting board 13, and has two positioning holes 341 and a circular hole 342. The washers 311, 312 and the fixing plate 34 are sleeved on the rod body 322 of the mandrel 32, the fixing plate 34 is located between the head portion 321 of the mandrel and the second connecting board 13, and is screwed to the second connecting board 13 through three screws 36, so that the fixing plate 34 is fixed to the second connecting board 13. Accordingly, the fixing plate 34 will not rotate with respect to the second connecting board 13. Each of the washers 312 have a protruding part 3121 respectively, which is engaged to the corresponding positioning hole 341 of the fixing plate 34. When the mandrel 32 rotates, the washers 312 having the round-shaped through hole and the fixing plate 34 having the circular hole 341 are static, but the washers 311, having through holes and engaged with the rod body 322, rotate together with the mandrel 32 around the axis X. The securing element 35 is fastened to the end portion 323 of the mandrel 32 so that the washers 311, 312 tightly abut against each other. Thus, the washers 311, 312 abutting against each other rotate with respect to each other when the mandrel 32 is rotating in the first rotating direction D1 or in the second rotating direction D2. The friction force generated between those washers 311, 312 is the resistance force provided by the resistance element 31. The number, shape, size, and material of the washers may be adjusted as needed.

The rotating element 4 is connected to the one-way damper 2 and the force module 3 respectively and actuated together with the one-way damper 2 and the force module 3. The rotating element 4 includes a main body 41, a receiving groove 42, a stopping portion 43, a supporting element 45, and an actuating element 46 (refer to FIG. 2). The receiving groove 42 is a through hole that passes through the main body 41 along the axis X and receives the shaft sleeve 33. The outer contour of the shaft sleeve 33 and the inner contour of the receiving groove 42 are matched with each other so that the shaft sleeve 33 can be engaged with the receiving groove 42. The end portion 323 of the mandrel 32 protrudes out from an opening of the receiving groove 42, facing the first connecting board 12, and is securely fixed to the securing element 35 (a nut) so that the head portion 321 of the mandrel 32 is maintained to abut against the fixing plate 34 fixed to the second connecting board 13. The rotating element 4 is utilized for carrying the display 5.

The stopping portion 43 is formed on the main body 41 and has a first stopping end 431 and a second stopping end 432. The stopping ends 431, 432 are disposed with respect to the stopping element 14 for determining a rotatable range of the rotating element 4. In the present embodiment, the stopping portion 43 is a notch, and the first stopping end 431 and the second stopping end 432 are two walls of the notch.

Figure 3:
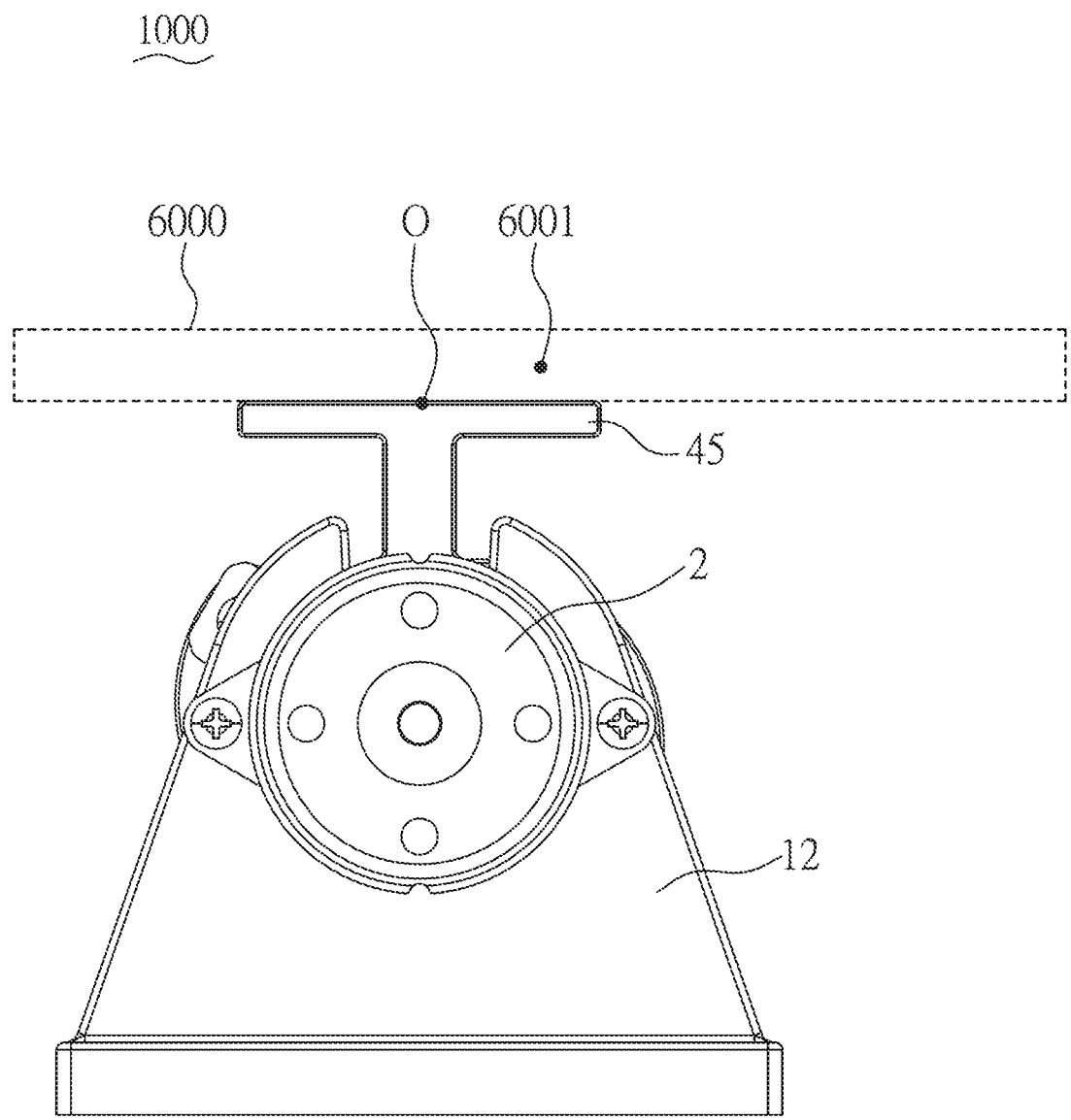
FIG. 3 is a side view showing the supporting stand of the first embodiment of the present invention.

Please refer to FIG. 3, which illustrates the side view of the supporting stand 100 viewed from one side of the first connecting board 12 (the left side of FIG. 1). The supporting body 45 supporting the panel 6000 is connected to the panel 6000 through a connecting point O (roughly the center point of the supporting body 45). In the present embodiment, the connecting point O deviates from the center of gravity 6001. The supporting body 45 extends out and away from the first connecting board 12 and the second connecting board 13 to ensure that the panel 6000 is keeping a distance with and do not interfere with the connecting boards 12, 13 respectively. When the rotating element 4 rotates around the axis X in the first rotating direction D1 or in the second rotating direction D2, the panel 6000 rotates simultaneously around the axis X. The torque generated by rotating the panel 6000 and the supporting body 45 in the first direction D1 and the torque generated by rotating the panel 6000 and the supporting body 45 in the second direction D2 are different because the connecting point O deviates from the center of gravity 6001. Accordingly, different compensational forces are needed when rotating in opposite directions.

Please refer to FIG. 2, the actuating element 46 has a coupling shaft 461 and a connecting plate 462 roughly configured U-shaped. The axis of the coupling shaft 461 overlaps with the axis X. The coupling shaft 461 is connected to the one-way damper 2, thus, the one-way damper 2 is actuated together with the actuating element 46 constantly. The connecting plate 462 is fixed to the main body 41, thus the one-way damper 2 is actuated together with the main body 41 constantly.

The one-way damper 2, the force module 3, and the rotating element 4 are arranged and disposed on the base 1 along the axis X. When the rotating element 4 rotates in the first rotating direction D1, the coupling shaft 461 of the actuating element 46 rotates in the first rotating direction D1 with respect to the one-way damper 2, therefore, the one-way damper 2 provides a first backward torque A1 to the rotating element 4. Also, the shaft sleeve 33 synchronously rotates with the rotating element 4 so that the mandrel 32 is actuated to rotate in the first rotating direction D1. The kinetic friction force is generated between the washers 311 of the force module 3 actuated together with the mandrel 32 and the static washers 312 not actuated together with the mandrel 31, thus, the force module 3 provides a second backward torque B1 to the rotating element 4. When the rotating element 4 rotates in the second rotating direction D2 and the coupling shaft 461 rotates in the second rotating direction D2 with respect to the one-way damper 2, the one-way damper 2 does not provide a torque. But, the mandrel 32 is actuated to rotate in the second direction D2 by the shaft sleeve 33 rotating synchronously with the rotating element 4. The friction force is generated between the washers 311 of the force module 3 actuated together with the mandrel 32 and the static washers 312 not actuated together with the mandrel 31, thus, the force module 3 provides a second forward torque B2 to the rotating element 4.

It should be noted that one of the technical features of the present invention is that the one-way damper 2 only provides a resisting torque when it rotates in a specific direction. In the present embodiment, the one-way damper 2 only provides resisting torque when the shaft (coupling shaft 461) connected to the one-way damper 2 rotates in the first rotating direction. Accordingly, the one-way damper 2 provides different torque when the rotating element rotates in different rotating direction.

In summary, when the rotating element 4 rotates in the first rotating direction D1, the one-way damper 2 and the force module 3 separately provide the first backward torque A1 and the second backward torque B1 to the rotating element 4. When the rotating element 4 rotates in the second rotating direction D2, the one-way damper 2 fails to provide the first forward torque A2, only the force module 3 provides the second forward torque B2 to the rotating element 4. The different absolute values of the second forward torque B2 and the sum of the first backward torque A1 and the second backward torque B1 provide different compensational forces when rotating the rotating element 4 in opposite directions, and allow the rotating element 4 to be rotated in a consistent manner and can be stopped at any position between a first position and a second position.

Figure 4:
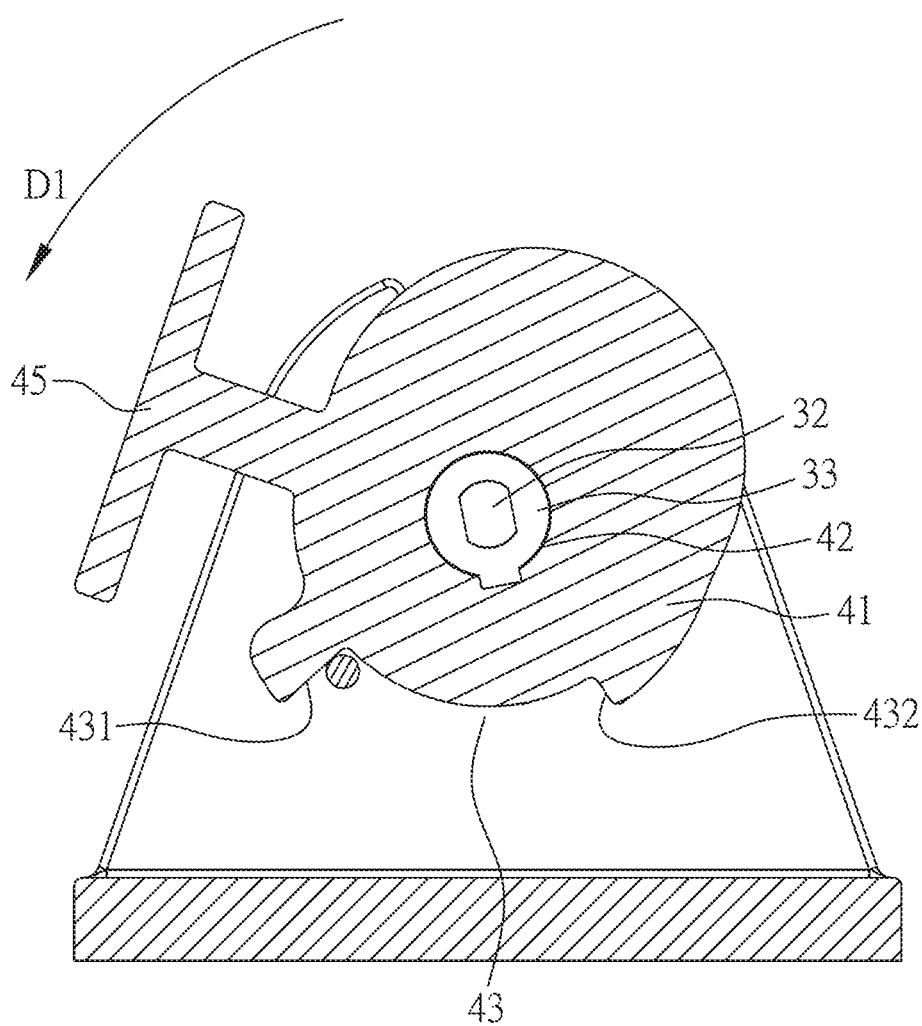
FIG. 4 is a cross-sectional view showing the supporting stand d of the first embodiment of the present invention rotating to the first location along the first rotating direction
Figure 5:
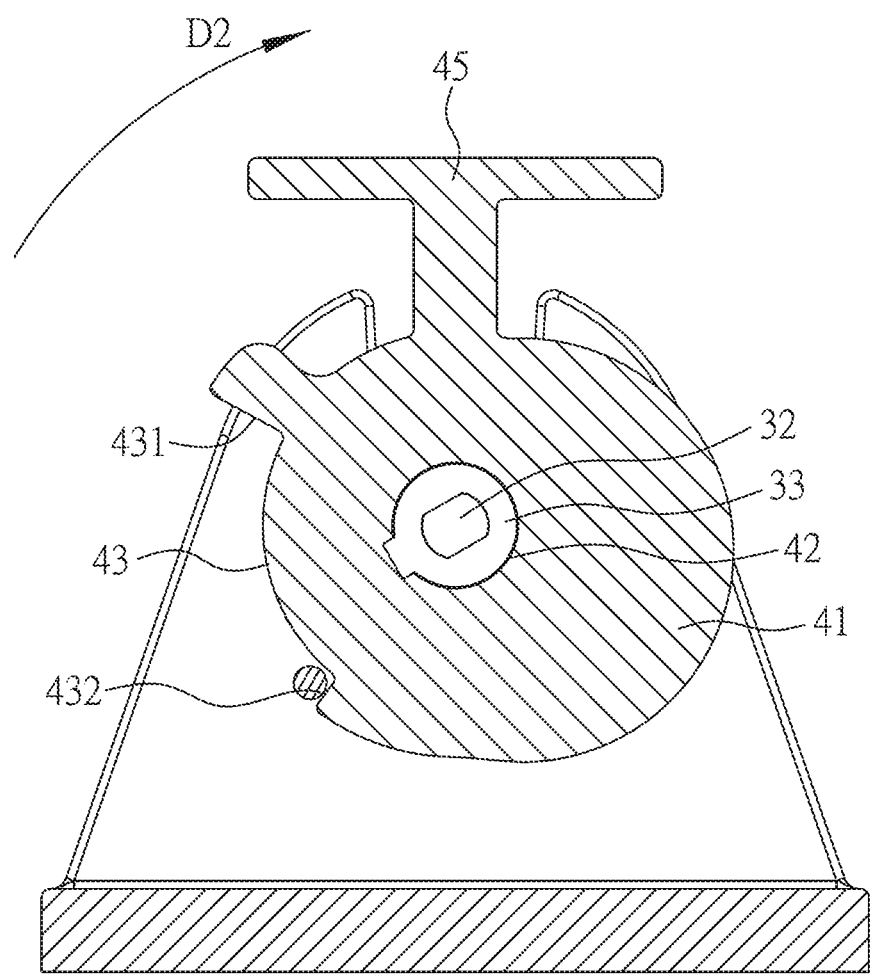
FIG. 5 is a cross-sectional view showing the supporting stand of the first embodiment of the present invention rotating back to the second location along the second rotating direction
Figure 6:
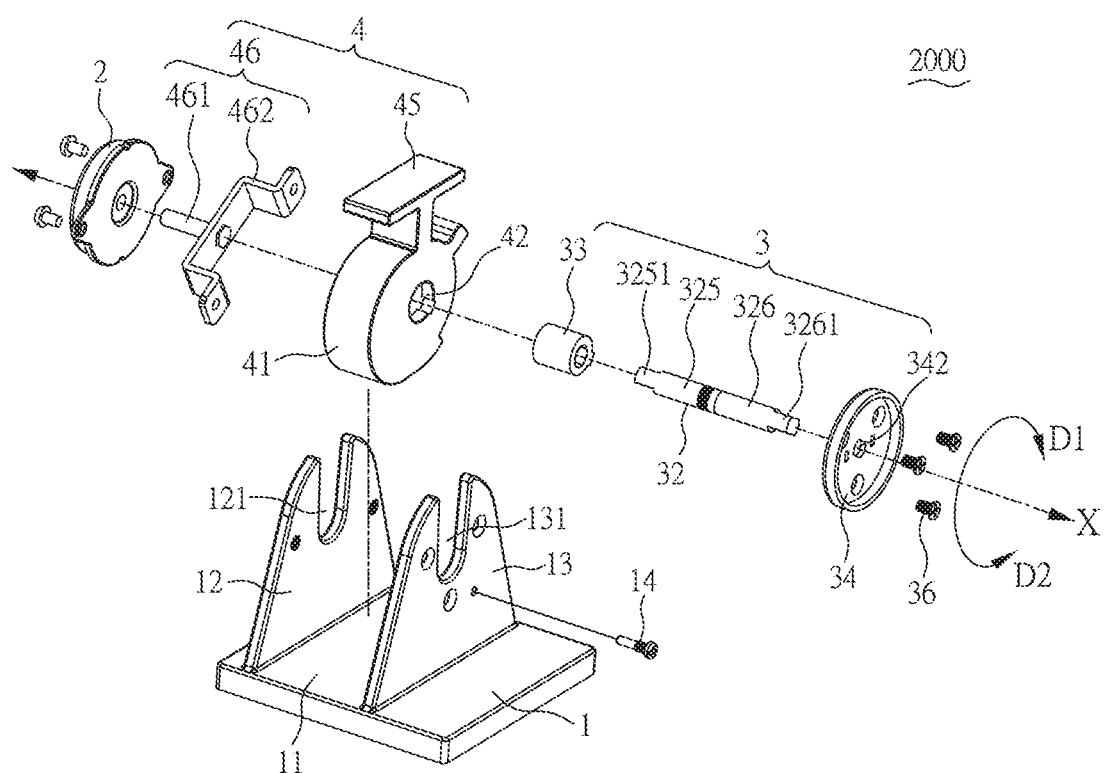
FIG. 6 is an exploded perspective view showing the supporting stand of the second embodiment of the present invention.

Please refer to FIG. 4, the rotating element 4 is in the first position when the rotating element 4 rotates in the first rotating direction D1 until the first stopping end 431 abuts against the stopping element 14. Please refer to FIG. 5, the rotating element 4 is in the second position when the rotating element 4 rotates in the second rotating direction D2 until the second stopping end 432 abuts against the stopping element 14. Accordingly, the position of the rotating element 4 is limited between the first position and the second position.

The supporting stand 2000 of the second embodiment of the present invention is similar to the supporting stand 1000 of the first embodiment except that the mandrel 31 of the force module 3 is a flathead shaft structure (the resistance element 31 is omitted).

The mandrel 32 of the present embodiment is composed of a male shaft 325 and a female shaft 326 corresponding to the male shaft 325. The male shaft 325 has a convex pillar (not shown in figures) and the female shaft 326 has a concave hole (not shown in figures) corresponding to the convex pillar at the joint of the male shaft 325 and the female shaft 326. In the present embodiment, the male shaft 325 passes through the shaft sleeve 33, and the female shaft 326 is fixed to the second connecting board 13. When the male shaft 325 rotates with respect to the female shaft 326, a resistance is generated due to the interference between the outer diameter of the male shaft 325 and the inner diameter of the female shaft 326. In other embodiment, the position of the male shaft 325 and the female shaft 326 may be swapped with each other, for instance, the female shaft 326 passes through the shaft sleeve 33 while the male shaft 325 is fixed to the second connecting board 13.

Different from the first embodiment, the receiving groove 42 of the rotating element 4 has only one opening facing the second connecting board 13 and the other side facing the first connecting board 12 is closed. The mandrel 32 passes through the shaft sleeve 33 through the male shaft 325. The inner contour of the shaft sleeve 33 and the cross-section of one end 3251 of the male shaft 325 are non-circular and are matched to each other so that the rotating element 4 and the mandrel 32 can synchronously rotate with each other. The male shaft 325 of the mandrel 32 and the shaft sleeve 33 are engaged with the receiving groove 42 and abut against the inner surface of the receiving groove 42. Accordingly, the supporting stand 2000 of the present embodiment does not have the securing element 35. The female shaft 326 is disposed on the second connecting board 13 through the fixing plate 34, wherein the female shaft 326 is fixed to the fixing plate 34 and is screwed to the second connecting board 13 through three screws 36, and thus the fixing plate 34 is fixed to the second connecting board 13 and does not rotate against the second connecting board 13. In addition, the female shaft 326 has an end 3261 which is inserted into the hole 342 of the fixing plate 34. The inner contour of the hole 342 and the cross-section of the end 3261 are non-circular and are corresponding to each other; therefore, the female shaft 326 and the fixing plate 34 are fixed to the second connecting board 13 together.

When the rotating element 4 rotates in the first rotating direction D1, the coupling shaft 461 of the actuating element 46 rotates in the first rotating direction D1 with respect to the one-way damper 2, therefore, the one-way damper 2 provides a first backward torque A1 to the rotating element 4. Also, the male shaft 325 is actuated by the shaft sleeve 33 and rotates in the first rotating direction D1 with respect to the female shaft 326 so that a second backward torque B1 generated by the interference between the convex pillar and the concave hole is provided to the rotating element 4. When the rotating element 4 rotates in the second rotating direction D2 and the coupling shaft 461 rotates in the second rotating direction D2 with respect to the one-way damper 2, the one-way damper 2 does not provide a first forward torque A2 to the rotating element 4. But, the male shaft 325 is actuated by the shaft sleeve 33 and rotates in the second rotating direction D2 with respect to the female shaft 326 so that a second forward torque B2, generated by the interference between the convex pillar and the concave hole, is provided to the rotating element 4.

In summary, the rotating element 4 encounters the first backward torque A1 provided by the one-way damper 2 and the second backward torque B1 provided by the force module 3 when rotating in the first rotating direction D1; the rotating element 4 encounters the second forward torque B2 provided by the force module 3 when rotating in the second rotating direction D2.

Figure 7:
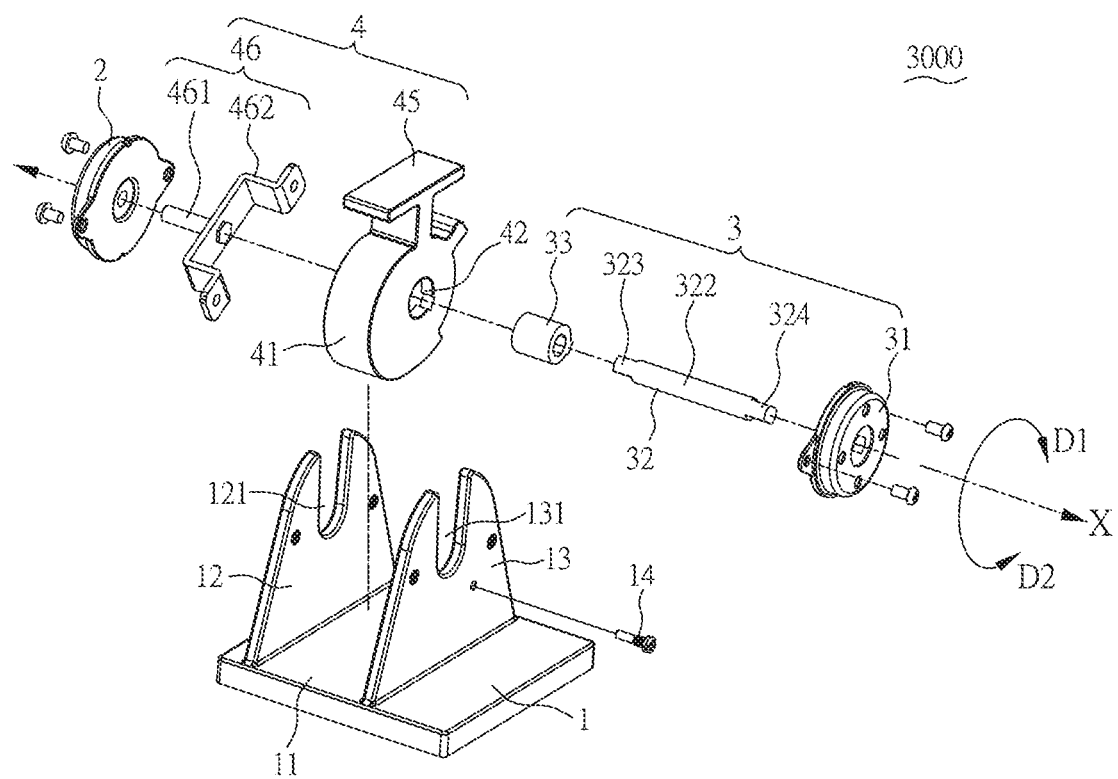
FIG. 7 is an exploded perspective view showing the supporting stand of the third embodiment of the present invention.

The supporting stand 3000 of the third embodiment of the present invention is illustrated in FIG. 7. The difference between the present embodiment and the two foregoing embodiments is that the resistance element 31 is a two-way damper. The character of the two-way damper is similar to that of the one-way damper. The two-way damper provides resistance when the shaft connected to the two-way damper rotates in both rotating directions; however, the one-way damper only provides resistance when the shaft rotates in one rotating direction.

The rotating element 4 of the present embodiment is structurally similar to that of the second embodiment, wherein the receiving groove 42 has only one opening facing the second connecting board 13 and the other side facing the first connecting board 12 is closed. The mandrel 32 passes through the shaft sleeve 33, is engaged with the receiving groove 42 together with the shaft sleeve 33, and abuts against the inner side of the receiving groove 42. The mandrel 32 of the present embodiment has the end portion 323 and a second end portion 324 corresponding to the end portion 323, wherein the second end portion 324 passes through and is disposed on the resistance element 31 fixed to the second connecting board 13.

When the rotating element 4 rotates in the first rotating direction D1, the coupling shaft 461 of the actuating element 46 rotates in the first rotating direction D1 with respect to the one-way damper 2, therefore, the one-way damper 2 provides a first backward torque A1 to the rotating element 4. Also, the shaft sleeve 33 synchronously rotates with the rotating element 4 so that the mandrel 32 is actuated to rotate in the first rotating direction D1 with respect to the resistance element 31. Thus, the force module 3 provides a second backward torque B1 to the rotating element 4. When the rotating element 4 rotates in the second rotating direction D2 and the coupling shaft 461 rotates in the second rotating direction D2 with respect to the one-way damper 2; however, the one-way damper does not provide a torque. But, the mandrel 32 is actuated to rotate in the second direction D2 by the shaft sleeve 33 with respect to the resistance element 31. Thus, the force module 3 provides a second forward torque B2 to the rotating element 4.

In summary, the rotating element 4 encounters the first backward torque A1 provided by the one-way damper 2 and the second backward torque B1 provided by the force module 3 when rotating in the first rotating direction D1; the rotating element 4 encounters the second forward torque B2 provided by the force module 3 when rotating in the second rotating direction D2.

In addition, the resistance element 31 illustrated in FIG. 7 can also be a one-way damper, which is the fourth embodiment of the present invention. In the present embodiment, both of the one-way damper 2 and the resistance element 31 are one-way damper, and one-way dampers respectively provides different resistances when rotating in different rotating direction.

When the rotating element 4 rotates in the first rotating direction D1, the coupling shaft 461 of the actuating element 46 rotates in the first rotating direction D1 with respect to the one-way damper 2, therefore, the one-way damper 2 provides a first backward torque A1 to the rotating element 4. Also, the shaft sleeve 33 synchronously rotates with the rotating element 4 so that the mandrel 32 is actuated to rotate in the first rotating direction D1 with respect to the resistance element 31. Thus, the force module 3 provides a second backward torque B1 to the rotating element 4. When the rotating element 4 rotates in the second rotating direction D2 and the coupling shaft 461 rotates in the second rotating direction D2 with respect to the one-way damper 2; however, the one-way damper 2 does not provide a first backward torque A2. At the meantime, the mandrel 32 is actuated to rotate in the second direction D2 by the shaft sleeve 33 with respect to the resistance element 31. Thus, the force module 3 provides a second forward torque B2 to the rotating element 4.

It should be noted that the resistance element 31 in the present invention is a one-way damper, the absolute value of the second forward torque B2 provided by the resistance element 31 when the mandrel 32, which is connected to the resistance element 31, rotates in the second rotating direction D2 is zero.

In summary, the rotating element 4 encounters the first backward torque A1 provided by the one-way damper 2 when rotating in the first rotating direction D1; the rotating element 4 encounters the second forward torque B2 provided by the force module 3 when rotating in the second rotating direction D2.

As mentioned above, the one-way damper 2 of the present invention is a constant source of the resistance provided to the rotating element 4 when the rotating element 4 rotates in the first rotating direction D1.

The resistance source of the force module 3 is the resistance element 31 or the mandrel 32. In the embodiments when the resistance element 31 is utilized as the resistance source, the resistance element 31 mainly is a frictional washer set, or a two-way damper, or a one-way damper; in the embodiments when the mandrel 32 is utilized as the resistance source, the mandrel 32 is a flathead shaft structure. However, in other embodiments, the resistance source of the force module 3 can be other devices that provide resistance in one rotating direction or in both rotating directions.

It should be noted that when the resistance source of the force module 3 is selected from the frictional washer set, the flathead shaft structure, and the two-way damper, such as the first, the second, and the third embodiments, the absolute values of the second backward torque B1 provided by the force module 3 when the rotating element 4 rotates in the first rotating direction D1 and the second forward torque B2 provided by the force module 3 when the rotating element 4 rotates in the second rotating direction D2 are not zero.

However, different from the first, the second, and the third embodiment, when the resistance source of the force module 3 is the one-way damper, such as the fourth embodiment, the absolute value of the second backward torque B1 provided by the force module 3 when the rotating element rotates in the first rotating direction D1 is zero.

When the rotating element 4 rotates in the first rotating direction D1, the one-way damper 2 provides a first backward torque A1 and the force module 3 provides a second backward torque B1. When the rotating element 4 rotates in the second rotating direction D2, the force module 3 provides a second forward torque B2. The main feature of the present invention is that the absolute value of the sum of the first backward torque A1 and the backward torque B1 does not equal to the absolute value of the second forward torque B2.

Figure 8:
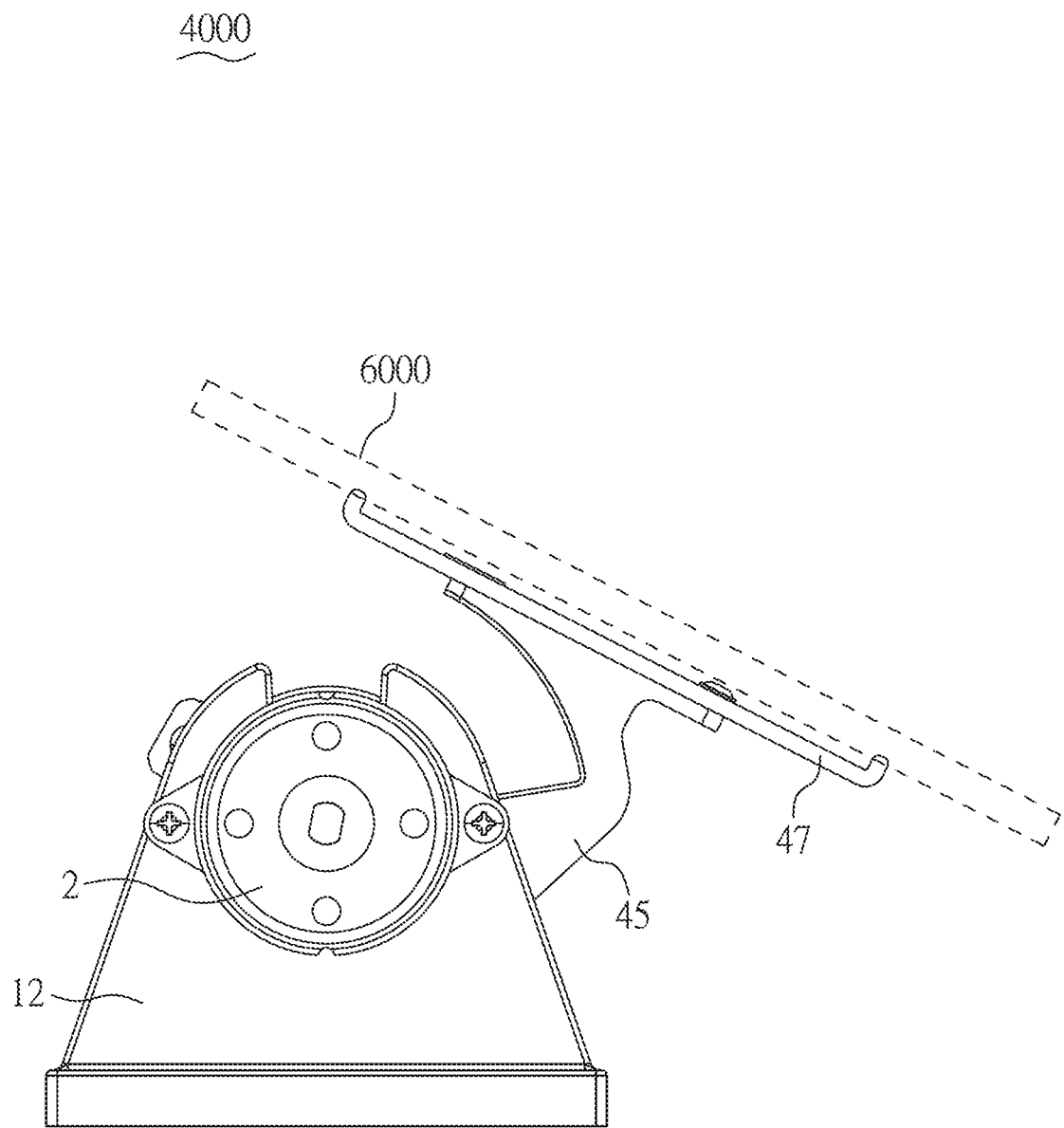
FIG. 8 is a perspective view showing the supporting stand of the fifth embodiment of the present invention.

The supporting stand 4000 of the fifth embodiment of the present invention is illustrated in FIG. 8. The only difference thereof from the supporting stand 1000 of the first embodiment is the shape of the rotating element 4. The supporting body 45 of the rotating element 4 extends to the right side and bends upwardly. The rotating element 4 further has a carrying plate 47 disposed on the supporting body 45, wherein the carrying plate 47 is located between the panel 6000 and the supporting body 45 so that the panel 6000 is capable of being placed stably on the rotating element 4.

The supporting stand 5000 of the sixth embodiment of the present invention is similar to that of the fifth embodiment, except that the base 1 does not include the bottom plate 11, wherein the bottom plate 11 is replaced by two supporting surfaces.

Figure 9:
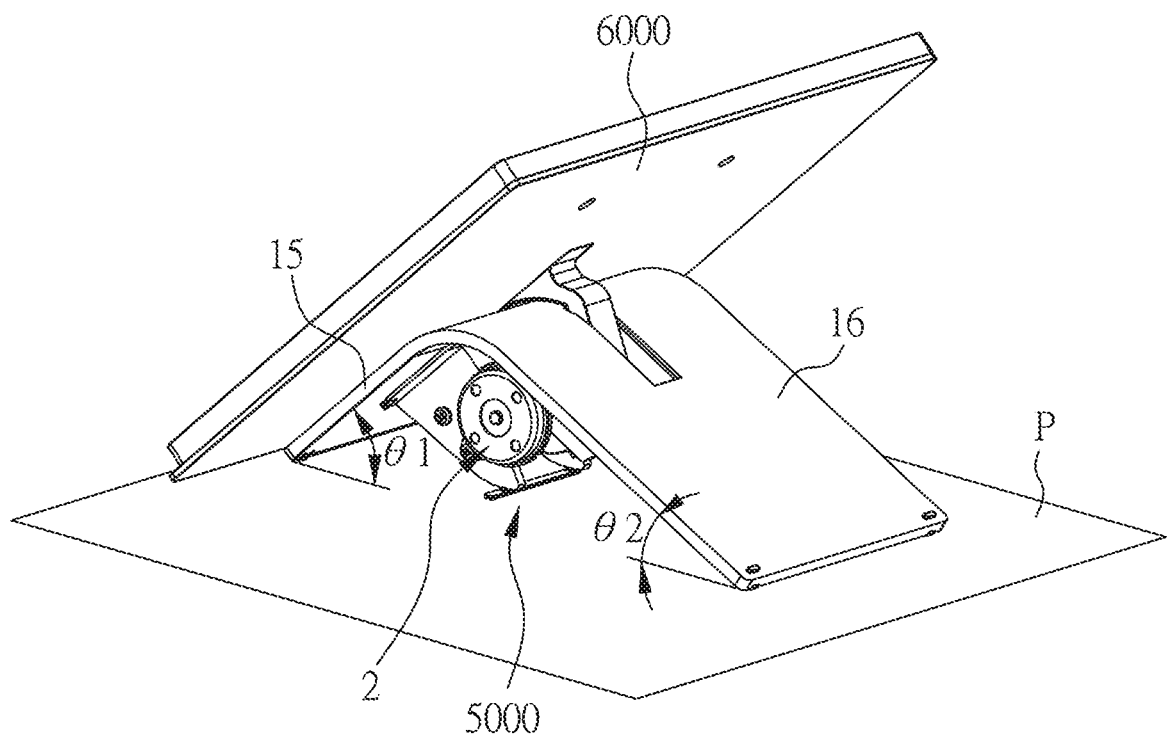
FIG. 9 is a perspective view showing the supporting stand of the sixth embodiment of the present invention connecting with a panel.
Figure 10:
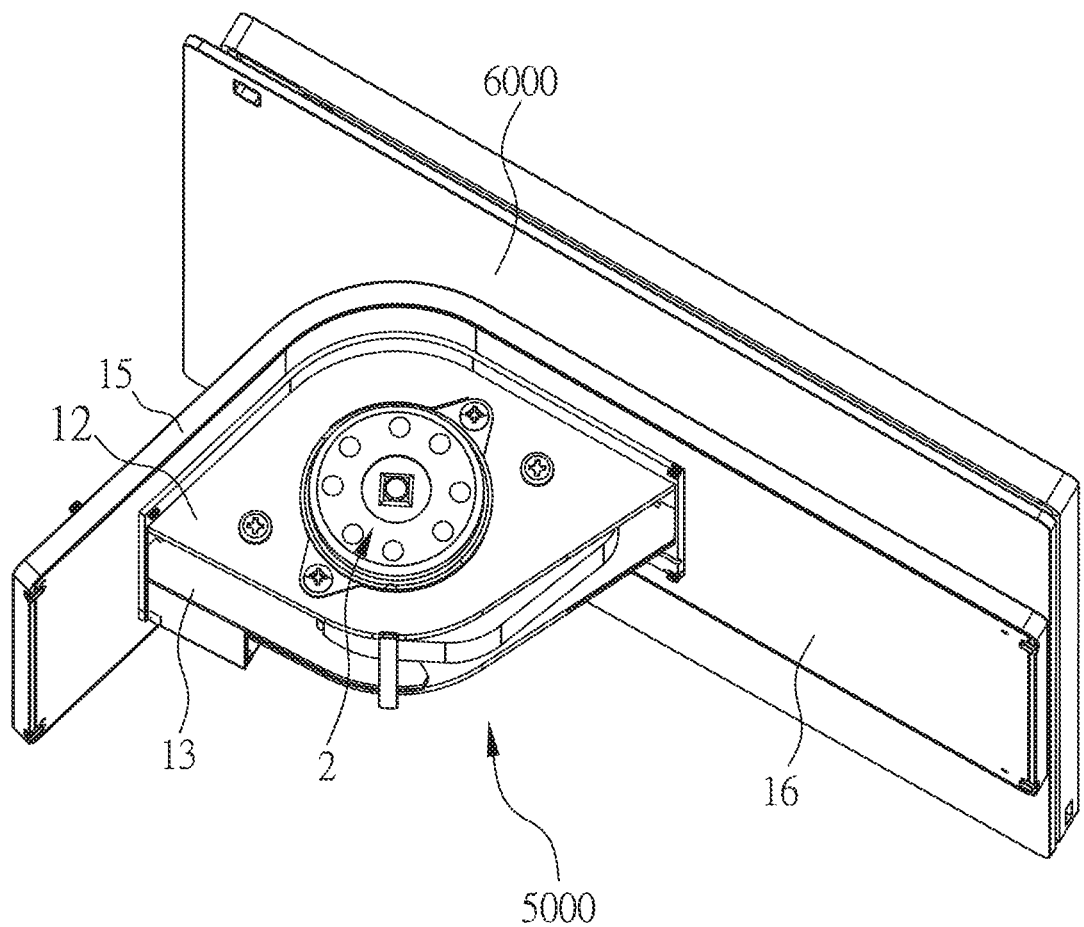
FIG. 10 is another perspective view showing the supporting stand of the sixth embodiment of the present invention connecting with a panel.

Please refer to FIG. 9 and FIG. 10, the base 1 of the present embodiment includes a first supporting surface 15, a second supporting surface 16, a first connecting board 12, and a second connecting board 13. The supporting stand 5000 of the present embodiment stands on a working surface P through the first supporting surface 15 and the second supporting surface 16. The first supporting surface 15 and the second supporting surface 16 are connected to each other and including an angle smaller than 180°. The first supporting surface 15 and the working surface P include a first angle $\theta 1$, the second supporting surface 16 and the working surface P include a second angle $\theta 2$, wherein the first angle $\theta 1$ does not equal to the second angle $\theta 2$, and the values of the first angle $\theta 1$ and the second angle $\theta 2$ do not equal to zero. The first connecting board 12 and the second connecting board 13, which are simultaneously disposed on the first supporting surface 15 and the second supporting surface 16, are spaced in an interval from each other.

In other embodiments, the stopping element 14 is not limited to be disposed on the second connecting board 13 and may be disposed on at least one of the connecting boards. The stopping element 43 is not necessary a notch but can be a set of protrusions that formed on the main body 41 or other designs configured for limiting the rotation range of the rotating element 4.

Accordingly, the supporting stand of the present invention can be adjusted according to the torque generated when rotating the rotating element in two opposite directions. The feeling for rotating the rotating element in opposite directions may be more variable for meeting the needs in various situations.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A supporting stand for supporting a panel, comprising:
    a base including a bottom board and a first connecting board disposed on the bottom board;
    a one-way damper being disposed on the first connecting board;
    a force module being disposed on the base and including a mandrel; and
    a rotating element being connected to the panel, the one-way damper, and the force module, including a coupling shaft, being actuated together with the one-way damper and the force module, and making the panel be capable of rotating around the mandrel in a first rotating direction or a second rotating direction opposite to the first rotating direction;
    wherein the one-way damper provides a first backward torque when the rotating element rotates in the first rotating direction, and the one-way damper does not provide torque to the rotating element but the force module provides a second forward torque when the rotating element rotates in the second rotating direction;
    wherein the coupling shaft and the mandrel are aligned with a same axis the coupling shaft is connected to the one-way damper for making the one-way damper be actuated together with the rotating element.

2. The supporting stand as claimed in claim 1, wherein the force module provides a second backward torque to the rotating element when the rotating element rotates in the first rotating direction.

3. The supporting stand as claimed in claim 2, wherein the value of the second backward torque provided by the force module is zero.

4. The supporting stand as claimed in claim 2, wherein an absolute value of a sum of the first backward torque and the second backward torque is not equal to an absolute value of the second forward torque.

5. The supporting stand as claimed in claim 4, wherein the force module further includes a shaft sleeve fixed to the rotating element and the mandrel so that the rotating element is actuated together with the mandrel.

6. The supporting stand as claimed in claim 5, wherein the base further includes a stopping element, and the rotating element further includes a first stop end and a second stop end, wherein the rotating element is located at a first position when the rotating element rotates in the first rotating direction until the first stop end abuts against the stopping element, and the rotating element is located at a second position when the rotating element rotates in the second rotating direction until the second stop end abuts against the stopping element.

7. The supporting stand as claimed in claim 6, wherein the rotating element further includes a supporting body for supporting the panel.

8. The supporting stand as claimed in claim 6, wherein the base further comprises a second connecting board disposed on the bottom board and spaced apart from the first connecting board, wherein the force module is disposed on the second connecting board.

9. The supporting stand as claimed in claim 2, wherein the force module further includes a resistance element connected to the mandrel, wherein the resistance element is a frictional washer set or a two-way damper.

10. The supporting stand as claimed in claim 3, wherein the force module further includes a resistance element connected to the mandrel, wherein the resistance element is a one-way damper.

11. The supporting stand as claimed in claim 2, wherein the mandrel is a flathead shaft structure.

12. A supporting stand for supporting a panel on a working surface, the supporting stand comprising:
   a base including a first supporting surface, a second supporting surface, and a first connecting board disposed on the first supporting surface and the second supporting surface, wherein the first supporting surface and the working surface include a first angle, and the second supporting surface and the working surface include a second angle which is unequal to the first angle;
   a one-way damper being disposed on the first connecting board;
   a force module being disposed on the base and including a mandrel; and
   a rotating element being connected to the panel, the one-way damper, and the force module, including a coupling shaft, being actuated together with the one-way damper and the force module, and making the panel be capable of rotating around the mandrel in a first rotating direction or a second rotating direction opposite to the first rotating direction;
   wherein the one-way damper provides a first backward torque when the rotating element rotate in the first rotating direction, and the one-way damper does not provide torque to the rotating element but the force module provides a second forward torque when the rotating element rotates in the second rotating direction;
   wherein the coupling shaft and the mandrel are aligned with a same axis, the coupling shaft is connected to the one-way damper for making the one-way damper be actuated together with the rotating element.

13. The supporting stand as claimed in claim 12, wherein the force module provides a second backward torque to the rotating element when the rotating element rotates in the first rotating direction.

14. The supporting stand as claimed in claim 13, wherein the value of the second backward torque provided by the force module is zero.

15. The supporting stand as claimed in claim 13, wherein an absolute value of a sum of the first backward torque and second backward torque is not equal to an absolute value of the second forward torque.

16. The supporting stand as claimed in claim 15, wherein the force module further includes a shaft sleeve fixed to the rotating element and the mandrel so that the rotating element is actuated together with the mandrel.

17. The supporting stand as claimed in claim 16, wherein the base further includes a stopping element, and the rotating element further includes a first stop end and a second stop end, wherein the rotating element is located at a first position when the rotating element rotates in the first rotating direction until the first stop end abuts against the stopping element, and the rotating element is located at a second position when the rotating element rotates in the second rotating direction until the second stop end abuts against the stopping element.

18. The supporting stand as claimed in claim 17, wherein the rotating element further includes a supporting body for supporting the panel.

* * * * *